April 4, 1967　　　J. F. WILSON ETAL　　　3,312,601
WATER IMMISCIBLE LIQUID CONDENSER IN MULTISTAGE
FLASH DISTILLATION
Filed July 21, 1964

3,312,601
WATER IMMISCIBLE LIQUID CONDENSER IN MULTISTAGE FLASH DISTILLATION

John F. Wilson, New Berlin, and William E. Littleton, Wauwatosa, Wis., assignors to Allis-Chalmers Manufacturing Company, Milwaukee, Wis.
Filed July 21, 1964, Ser. No. 384,182
12 Claims. (Cl. 203—11)

This invention relates generally to multistage flash distillation. More particularly, this invention is concerned with a new and improved multistage flash evaporator system wherein higher brine temperatures can be maintained to effect increased capacities and efficiencies.

Flash evaporators for the purification of brine or saline sea water are well known in the prior art. In such systems, heated brine, or saline water, at saturation pressure flows into a flash chamber wherein a pressure is maintained which is slightly less than the pressure of the incoming brine. Because the incoming brine, or saline water is at saturation pressure, the reduced pressure causes a portion of the incoming brine to flash to steam. The temperature of the brine responsively drops to the saturation temperature corresponding to the pressure within the chamber. The steam, which is free of salt and other minerals, condenses in a condenser compartment within the flash chamber.

In multistage flash evaporators the brine passes in a like manner through a series of such flash chambers wherein each flash chamber is at a pressure slightly lower than the preceding chamber, and in each a portion of the brine flashes to steam or vapor. The steam or vapor in each flash chamber is condensed to pure water in separate condensers associated with each flash chamber.

In the multistage flash evaporators of the prior art, the saline feed water to be purified (hereinafter referred to as brine) is preheated by circulating it through the flash chamber or condensers as the condenser coolant and in a direction countercurrent to that of the hot brine flow. That is, by passing the fresh brine through the condensers as condenser coolant in the order of increasing temperature, the brine is preheated. The preheated brine is then further heated in any suitable heat exchanger and passed back into the flash chamber to be distilled as described above.

The biggest problem encountered in such multistage flash evaporators is that of scale and deposit buildup within the heat exchanger and the condenser coolant pipes in the hotter stages. In order to avoid excessive scale buildup, the brine in the hottest stage should not exceed about 250° F. Even then there will be some scale and deposit formation making it necessary to clean the system frequently. Since the scale is an insulator which greatly reduces the efficiency of the system, very little scale formation can be tolerated. Yet to operate at temperatures so low as to substantially avoid all scale deposits (below 200° F.) would be to severely reduce the capacity of the system. Thus, the brine feed temperature of about 250° F. seems to be a practical balance between acceptable capacity and tolerable scale buildup.

This invention is predicated upon an improved multistage flash evaporator having increased capacity and efficiency by providing a plurality of stages at the head of the system capable of being maintained at temperatures far in excess of 250° F., or on the order of 300 to 400° F. This is made possible without the usually attendant scale problems by elimination of metalic heat transfer surfaces in contact with brine solutions above 200° F. In this improved multistage flash evaporator, an oil, or some water immiscible liquid, is used as coolant in the hotter condenser stages, which accordingly leaves no scale or deposits in the condenser coolant pipes. The efficiency of the system is maintained by transferring the heat content of the immiscible liquid to the partially preheated brine in a liquid-liquid contact. The heat exchanger wherein the brine is finally heated prior to flashing must be a direct contact heat exchanger rather than the shell and tube type common to the prior art. Thus, the system comprises a plurality of high temperature and low temperature stages, the low temperature stages being similar or identical to those of the prior art. The high temperature stages being different from the low temperature stages only in that a higher temperature and pressure sequence is maintained, and that a water immiscible liquid, not brine, is used as condenser coolant. The system further differs from the prior art in that a liquid-liquid heat exchanger is used to further preheat the brine, and in that a direct contact heat exchanger must be used to finally heat the brine prior to flashing.

Accordingly, it is a primary object of this invention to provide an improved multistage flash evaporator whereby brine feeds at temperatures of from 300 to 400° F. may be processed without scale or deposit buildup problems.

It is another primary object of this invention to provide a multistage flash evaporator having no high temperature metallic heat transfer surfaces in contact with the brine.

It is a further primary object of this invention to provide a multistage flash evaporator having an increased capacity and efficiency.

These and other objects and advantages are fulfilled by this invention as will become apparent from a full understanding of the following detailed description, especially when read in conjunction with the accompanying drawing which is a schematic representation and flow diagram of the multistage flash evaporator employed in this invention.

Referring to the drawing, five flash chambers 10 are shown. It should be understood that the system is not limited to five stages as any number can be employed. The greater the number of stages in a system the greater the resulting efficiency, and of course the greater the cost of the system. For example, prior art evaporators are well known having anywhere from one to thirty-six or more stages.

Within each stage and adjacent to the flash chamber is a condenser chamber 11. The condenser chamber 11 may be adjacent to the flash chamber as shown in the drawing or it may be above or even in a separate housing connected to the flash chamber by vapor passage. For purposes of clarity and simplicity however, the single housing structure as shown in the drawing will be described.

In the heat exchanger 12, preheated brine previously used as condenser coolant is further heated by the direct injection of steam from steam generator 13. The steam generator 13 may be any suitable device for producing steam as a steam boiler for example. The heated brine emerges from the heat exchanger 12 at temperatures on the order of 300 to 400° F. and at saturation pressures, and is passed into the first flash chamber 10 by a pipe or any conduit 14. The pressure within the flash chamber is maintained at a value slightly less than that of the incoming brine. Under this reduced pressure, the internal heat of the brine causes a portion of the water within the brine to flash to steam until the temperature of the brine drops to a value which is the saturation temperature corresponding to the pressure within the chamber. The steam within the chamber passes into the condenser zone 11 where it is condensed on the coolant tubes 15 and is collected therebeneath in trough 16. This condensed water is pure and thus it is necessary to keep it separated from the brine by divider 17. As mentioned above, some systems may do this by other arrangements such as maintaining the condenser tubes above the brine with a trough immediately therebeneath, or by housing the condenser completely separate from the flash chamber.

The slightly cooled brine in the first stage or flash chamber 10, being at a slightly lower saturation pressure is conveyed into the second flash chamber by pipe 18. The second flash chamber is maintained at a pressure slightly lower than the first, and again, in combination with the internal heat of the brine, causes a portion of the water in the incoming brine to be flashed to steam or vapor. The temperature of the brine further drops to the temperature corresponding to the lower saturation pressure. The steam or vapor is condensed in a manner similar or identical to that in the first stage. Accordingly, the brine passes successively into each stage where the pressure is slightly less than in the preceding stage and in each a portion of the water in the brine is flashed to steam or vapor. In each stage the temperature of the brine is successively lowered to the corresponding saturation pressure within the respective chamber.

The distillate from the condenser in the first stage is passed into the distillate of the second stage by means such as a pipe 23, and so on through all stages. In this manner the distillate is cooled to the temperature of the final stage without severe heat losses since the waste heat is transferred to the condenser coolant. Furthermore, it would not be practical to extract the distillate from the system at the hotter stages because it is so hot that it would flash to steam or vapor if subjected to mere atmospheric pressures. As the distillate from one stage passes into the next, a portion of it will flash to steam or vapor, but it is eventually condensed with the vapor flashed from the brine. The final distillate is extracted as purified water from the last stage through pipe 24.

There are several methods available for maintaining the pressure differential across the several stages. For example, pressure breakdown valves 18A and 23A could be employed on pipes 18 and 23 as shown in the drawing, or pressure balancing U-tubes (not shown) could be employed as described by H. E. Bethon, U.S. 2,908,618. All such systems however, are well known in the art and need not be further discussed here.

Since the last stage, or last several stages, may be at pressures substantially below atmospheric pressure, it will be necessary to provide pumps on pipes 19 and 24 so that the "blowdown" brine and pure water may be extracted. Pumps will of course be necessary in the recirculation system as on pipes 20 and 21, and on the water immiscible circuit as on pipe 25.

Upon extracting the brine from the final stage it is recirculated rather than discarded because its heat content lends efficiency to the system. That is, it reduces the degree by which the feed must be heated. However, a portion of the extracted brine is discarded through pipe 19 and the balance is pumped through pipe 20 for recirculation. It is necessary to discard or "blow-down" a portion of this brine rather than recirculating the total amount so as to prevent a continual buildup of salt and other dissolved minerals as the brine is repeatedly recirculated.

Since the recirculated brine is at a temperature equal to the temperature within the last stage, it is obvious that it would not be an effective coolant within the condenser of the last stage. Accordingly, this recirculated brine bypasses at least the last stage in pipe 20 and is fed as condenser coolant into the stages preceding those bypassed. In the last stage, or the bypassed stages, fresh cool brine is used as condenser coolant, being admitted through pipe 21. After this fresh cool brine is preheated in the bypassed stage or stages a portion of it is discarded through pipe 22 and the balance being equal in volume to the "blowdown" brine through pipe 19 and the distillate, is added to the recirculated brine in pipe 20. Although the drawing shows that only the last stage is bypassed by the recirculated brine, it may be desirable, especially in units employing many stages, to bypass more than one stage so that a sufficient temperature differential between the relative stages and condenser coolant are realized.

The recirculated and fresh brine mixture is circulated through the stages in the order of increasing temperature as condenser coolant, which also serves to preheat the brine. If this brine is heated to temperatures above about 200° F. within the condenser coolant pipes 15, scale and deposits will form on the interior surfaces of the pipes severely impairing the heat transfer coefficients and the efficiency and capacity of the system. Therefore, in all stages wherein the internal temperature is above about 200° F., a water immiscible liquid such as oil or silicones are used as the condenser coolant. It is necessary that this coolant be immiscible with water, have a relatively low vapor pressure, and have a density substantially different from the brine being either well above or below that of water.

In the drawing the immiscible coolant is admitted as condenser coolant, to the second stage through pipe 25. From this point on the coolant is circulated through stages in the order of increasing temperature in the same manner as was the brine coolant in the cooler stages. Although the drawing shows that only the first two stages use the nonbrine or water immiscible condenser coolant, it should be understood that the nonbrine coolant should be circulated through all the stages above about 200° F. in order to prevent scale and deposit buildup in the condenser pipes. Therefore, the greater the number of stages in any given system, the greater the number of stages that system would have above about 200° F. which would require water immiscible condenser coolant.

The water immiscible condenser coolant is of course heated while in the condenser coolant pipes by heat exchange from the condensing steam. Accordingly, it is retrieved from the hottest stage at a temperature slightly lower than the internal temperature within said hottest stage. This hot coolant is then conveyed through pipe 27 into a two-phase liquid direct contact heat exchanger 28, where the excess heat content of the oil is transferred to the partially preheated brine coming from the third stage condenser through pipe 26. Thus, the brine is preheated to such a degree as if it had been used as condenser coolant throughout all the stages, except that in the hotter stages it is not heated by contact with a metallic heat transfer surface, but by contact across a liquid-liquid surface. By heating the brine liquid well above 200° F. through a liquid-liquid interface heat exchange, no scale or deposits are formed and the efficiency and capacity of the system are not impaired.

The two phase liquid heat exchanger should be so chosen or designed so as to avoid metallic or solid heat transfer surfaces allowing for heat exchange across a liquid interface. Although any direct contact liquid-liquid heat exchanger will suffice, one design deemed suitable is of the type wherein the two immiscible liquids enter at opposite ends, the lighter liquid entering at a low point and the heavier liquid entering at a high point. The heat exchange is effected as the light liquid filters up through the heavy liquid and the heavy down through the light. The two liquids are extracted at opposite ends from that entered, the heavy liquid from a low point and the light liquid from a high point. Thus, it is evident that the nonbrine coolant should be immiscible in water, and have a density different from that of water so that separation in the heat exchanger may be readily effected. It is evident that some scale or slime will be formed at the liquid interface as the heat is exchanged. However, this slime will float to the top of the mixture and will not impair the heat transfer efficiency.

The completely preheated brine from the two-phase liquid heat exchanger 28 is conveyed through pipe 29 into the direct contact heat exchanger 12. Steam from the steam generator 13 is conveyed through pipe 30 and injected into the preheated brine to bring it up to the final temperature for flashing in the first stage.

Although the multistage flash distillation systems of the prior art have most commonly used shell and tube type heat exchangers, such heat exchangers cannot be used in this process if the full efficiency and capacity are to be realized with brine temperatures in the range of from 300 to 400° F. If a shell and tube type heat exchanger were used in this system with brine temperatures well in excess of 300° F., scale and other deposits would quickly form on the heat exchanger tubes greatly decreasing the efficiency and capacity of the system. Therefore, it is necessary that a direct contact heat exchanger be used wherein metallic heat transfer surfaces are kept at a minimum. One direct contact heat exchanger especially well suited for use in this system is the heat exchanger of applicants' copending patent application S.N. 365,112, filed May 5, 1964. This heat exchanger was conceived and developed especially for the purpose of heating brine and saline water to temperatures in excess of 300° F. without encountering scale and deposit problems.

The water supply for the steam generator 13 must of course be clean fresh water from any source. However, for efficiency considerations it may be desirable to extract this water directly from the flash distillation system at an elevated temperature so as to reduce the heat input requirements, as shown in the drawing by pipe 31. A well operated system having many stages may take as little as 10 to 15 percent of the pure water production for steam generation purposes.

While only a preferred embodiment of this invention has been described, it should be understood that this invention is not to be limited to such details, but may be modified within the scope of the appended claims.

The embodiments of the invention in which an exclusive property or privilege is claimed are defined as follows:

1. A multistage flash evaporator for producing pure water from brine solutions comprising in combination; a plurality of high temperature and low temperature flash chambers, means for interconnecting said flash chambers in series so that the brine may be conveyed in a predetermined path through all flash chambers, means for maintaining each succeeding flash chamber at a lower pressure and temperature than the flash chamber which precedes it, a first condenser circuit wherein a condenser is associated with each of said low temperature flash chambers and fresh brine is circulated as a condenser coolant in the order of increasing temperature, a second condenser circuit wherein a condenser is associated with each of said high temperature flash chambers wherein a water immiscible liquid is circulated as condenser coolant in the order of increasing temperature, means for transferring the internal heat of the water immiscible coolant to preheat said brine coolant, means for further heating said preheated brine coolant to a temperature greater than that in the high temperature flash chambers and at saturation pressure, and means for conveying said heated brine to the highest temperature flash chamber.

2. A multistage flash evaporator for producing pure water from brine comprising in combination; a plurality of high temperature and low temperature stages each comprising a flash chamber and a vapor condenser, means interconnecting each flash chamber with its associated vapor condenser so that vapor may readily pass from the flash chamber into the vapor condenser, means for connecting all of said flash chambers in series so that brine may be conveyed from one flash chamber into the next, means for maintaining each succeeding flash chamber at a lower pressure and temperature than the flash chamber which precedes it, coolant tubes within the vapor condensers of the high temperature stages so interconnected that a water immiscible liquid may be circulated as condenser coolant in a direction of increasing temperature, coolant tubes within the vapor condensers of the low temperature stages so interconnected that fresh brine may be circulated as condenser coolant in a direction of increasing temperature, a liquid-liquid heat exchanger for transferring the internal heat of the water immiscible coolant to the fresh brine coolant, a direct contact heat exchanger for further heating the said brine coolant to a temperature in excess of 200° F. at saturation pressure, and means for conveying said heated brine to the highest temperature flash chamber.

3. A multistage flash evaporator for producing pure water from brine comprising in combination; a plurality of high temperature and low temperature stages each comprising a flash chamber and a vapor condenser, means interconnecting each flash chamber with its associated vapor condenser so that vapor may readily pass from the flash chamber into the vapor condenser, means for connecting all of said flash chambers in series so that brine may be conveyed from one flash chamber into the next, means for maintaining each succeeding flash chamber at a lower pressure and temperature than the flash chamber which precedes it, coolant tubes within the vapor condensers of the high temperature stages so interconnected that a water immiscible liquid having a relatively low vapor pressure and a density substantially different from the density of the brine, may be circulated as condenser coolant in a direction of increasing temperature, coolant tubes within the vapor condensers of the low temperature stages so interconnected that fresh brine may be circulated as condenser coolant in a direction of increasing temperature, means for transferring the internal heat of the water immiscible coolant to the fresh brine coolant, means for further heating the said brine coolant to a temperature in the range of from about 300 to about 400° F. at saturation pressure, and means for conveying said heated brine to the highest temperature flash chamber.

4. A multistage flash evaporator for producing pure water from brine comprising in combination; a plurality of high temperature and low temperature stages each comprising a flash chamber and a vapor condenser, means interconnecting each flash chamber with its associated vapor condenser so that vapor may readily pass from the flash chamber into the vapor condenser to be condensed as pure water, means for collecting the pure water, means for connecting all of said flash chambers in series so that brine may be conveyed from one flash chamber into the next, means for connecting all of said condensers in series so that the pure water may be conveyed from one condenser into the next, means for maintaining each succeeding stage at a lower pressure and temperature than the stage which precedes it, coolant tubes within the vapor condensers of the high temperature stages so interconnected that a water immiscible liquid selected from the group consisting of oils and silicones, may be circulated as condenser coolant in a direction of increasing temperature, coolant tubes within the vapor condensers of the low temperature stages so interconnected that fresh brine may be circulated as condenser coolant in a direction of increasing temperature, a two phase liquid heat exchanger for transferring the internal heat of the water immiscible coolant to the fresh brine coolant, a direct contact heat exchanger for further heating the said brine coolant to a temperature in the range of 300 to 400° F. at saturation pressure, and means for conveying said heated brine to the highest temperature flash chamber.

5. In a multistage flash evaporator wherein pure water is recovered from hot brine by passing said hot brine, at saturation pressure, through a plurality of closed flash chambers in series wherein the brine is subjected to progressively lower pressures and temperatures causing a portion of the water in said brine to flash to vapor, each flash chamber having a condenser associated therewith wherein the said vapor is condensed on cooling condenser tubes and collected in a trough therebeneath, and wherein the fresh brine to be flashed is preheated by circulating said fresh brine as condenser coolant progressively from cooler to hotter stages, the improvement comprising: means for supplying a water immiscible coolant in all condensers above about 200° F. which is conveyed in a direction of increasing temperature, means for transferring the internal heat of the water immiscible coolant to the preheated fresh brine, and means for further heating the fresh preheated brine to temperatures in excess of about 250° F. by the direct injection of steam.

6. In a multistage flash evaporator wherein pure water is recovered from hot brine by passing said hot brine, at saturation pressure, through a plurality of closed flash chambers in series wherein the brine is subjected to progressively lower pressures and temperatures causing a portion of the water in said brine to flash to vapor, each flash chamber having a condenser associated therewith wherein the said vapor is condensed on cooling condenser tubes and collected in a trough therebeneath, and wherein the fresh brine to be flashed is preheated by circulating from said fresh brine as condenser coolant progressively from cooler to hotter stages, the improvement comprising: means for supplying a water immiscible coolant in all condensers above about 200° F. which is conveyed in a direction of increasing temperature, a liquid to liquid heat exchanger for transferring the internal heat of the water immiscible coolant to the preheated fresh brine, and a direct contact heat exchanger for further heating the fresh preheated brine to temperatures in excess of 250° F. by the direct injection of steam.

7. In a multistage flash evaporator wherein pure water is recovered from hot brine by passing said hot brine, at saturation pressure, through a plurality of closed flash chambers in series wherein the brine is subjected to progressively lower pressures and temperatures causing a portion of the water in said brine to flash to vapor, each flash chamber having a condenser associated therewith wherein the said vapor is condensed on cooling condenser tubes and collected in a trough therebeneath, and wherein the fresh brine to be flashed is preheated by circulating said fresh brine as condenser coolant progressively from cooler to hotter stages, the improvement comprising: means for supplying a water immiscible liquid selected from the group consisting of oils and silicones, as condenser coolant in all condensers above about 200° F. which is conveyed in a direction of increasing temperature, a liquid to liquid heat exchanger for transferring the internal heat of the water immiscible coolant to the preheated fresh brine, and a direct contact heat exchanger for further heating the fresh preheated brine to temperatures in the range of 300 to 400° F. by the direct injection of steam.

8. In the method of producing pure water from brine solutions whereby the said brine solution is heated to an elevated temperature and maintained at a saturation pressure corresponding to said elevated temperature, then passing the heated brine through a successive series of flash chambers wherein the pressure under which the brine is maintained is successively reduced, thereby causing a portion of said brine to flash to vapor with an associated drop in temperature, then condensing said vapor as pure water on condenser pipes and recovered thereunder, and whereby the brine to be so processed is first preheated by utilizing said brine as a coolant in said condenser pipes, the improvement comprising; preheating the fresh brine by utilizing it as condenser coolant in only those stages below about 200° F., utilizing a water immiscible liquid as condenser coolant in all stages above that temperature where scale and deposit would form, further preheating the brine by transferring the internal heat of said water immiscible coolant to the said brine, and heating the brine to a final temperature of from 300 to 400° F. in a direct contact heat exchanger.

9. In the method of producing pure water from brine solutions whereby the said brine solution is heated to an elevated temperature and maintained at a saturation pressure corresponding to said elevated temperature, then passing the heated brine through a successive series of flash chambers wherein the pressure under which the brine is maintained is successively reduced, thereby causing a portion of said brine to flash to vapor with an associated drop in temperature, then condensing said vapor as pure water on condenser pipes and recovered thereunder, and whereby the brine to be so processed is first preheated by utilizing said brine as a coolant in said condenser pipes, the improvement comprising; preheating the fresh brine by utilizing it as condenser coolant in only those stages below about 200° F., utilizing a water immiscible liquid having a low vapor pressure and a density substantially different from the density of the brine, as condenser coolant in all stages above about 200° F., further preheating the brine by transferring the internal heat of said water immiscible coolant to the said brine, and heating the brine to a final temperature of from 300 to 400° F. in a direct contact heat exchanger.

10. In the method of producing pure water from brine solutions whereby the said brine solution is heated to an elevated temperature and maintained at a saturation pressure corresponding to said elevated temperature, then passing the heated brine through a successive series of flash chambers wherein the pressure under which the brine is maintained is successively reduced, thereby causing a portion of said brine to flash to vapor with an associated drop in temperature, then condensing said vapor as pure water on condenser pipes and recovered thereunder, and whereby the brine to be so processed is first preheated by utilizing said brine as a coolant in said condenser pipes, the improvement comprising; preheating the fresh brine by utilizing it as condenser coolant in only those stages below about 200° F., utilizing a water immiscible liquid selected from the group consisting of oils and silicones, as condenser coolant in all stages above about 200° F., further preheating the brine by transferring the internal heat of said water immiscible coolant to the said brine, and heating the brine to a final temperature of from 300 to 400° F. in a direct contact heat exchanger.

11. A multistage flash evaporator for producing pure water from brine solutions comprising in combination; a plurality of high temperature and low temperature flash chambers, means for interconnecting said flash chambers in series so that the brine may be conveyed in a predetermined path through all flash chambers, means for maintaining each succeeding flash chamber at a lower pressure and temperature than the flash chamber which precedes it, a first condenser circuit wherein a condenser is associated with each of said low temperature flash chambers and fresh brine is preheated by circulating said brine as a condenser coolant in the order of increasing temperature, a second condenser circuit wherein a condenser is associated with each of said high temperature flash chambers wherein a water immiscible liquid is heated by circulating said liquid as condenser coolant in the order of increasing temperature, means for further heating said fresh brine coolant to a temperature greater than that of the highest temperature flash chamber, and means for conveying said heated brine to the highest temperature flash chamber.

12. A multistage flash evaporator for producing pure water from brine solutions comprising in combination; a plurality of high temperature and low temperature flash chambers, means for interconnecting said flash chambers in series so that the brine may be conveyed in a predetermined path through all flash chambers, means for maintaining each succeeding flash chamber at a lower pressure and temperature than the flash chamber which precedes it, a first condenser circuit wherein a condenser is associated with each of said low temperature flash chambers and fresh brine is preheated by circulating said brine as a condenser coolant in the order of increasing temperature, a second condenser circuit wherein a condenser is associated with each of said high temperature flash chambers wherein a water immiscible liquid is heated by circulating said liquid as condenser coolant in the order of increasing temperature, means for further heating said fresh brine coolant with the heated water immiscible liquid, and means for conveying said heated brine to the highest temperature flash chamber.

References Cited by the Examiner

UNITED STATES PATENTS

| | | | |
|---|---|---|---|
| 2,976,224 | 3/1961 | Gilliland | 203—10 |
| 3,165,452 | 1/1965 | Williams | 203—11 |
| 3,203,873 | 8/1965 | Wirth | 202—174 |
| 3,232,847 | 2/1966 | Hoff | 203—11 X |
| 3,236,747 | 2/1966 | Margiloff | 203—11 |

NORMAN YUDKOFF, *Primary Examiner.*

F. E. DRUMMOND, *Assistant Examiner.*